United States Patent Office 3,585,164
Patented June 15, 1971

3,585,164
CASTING TECHNIQUE USING PURGE GAS
Robert Jerome Tucker, Hackettstown, N.J., assignor to American Cyanamid Company, Stamford, Conn.
No Drawing. Filed Mar. 18, 1969, Ser. No. 808,329
Int. Cl. C08f 45/60
U.S. Cl. 260—45.75
4 Claims

ABSTRACT OF THE DISCLOSURE

A defined class of tetraaryl arylaminium salt infrared absorbers are successfully incorporated into polymethylmethacrylate by an improved casting technique in which the polymer syrup containing the infrared absorber is purged with an inert gas to remove dissolved oxygen therefrom and then degassed prior to being poured into the heat-curing cell.

---

This invention relates to a method for incorporating infrared absorbers into clear polymethylmethacrylate by monomer casting techniques. More particularly, it relates to a method for incorporating therein infrared absorbers represented by the formula:

(I)

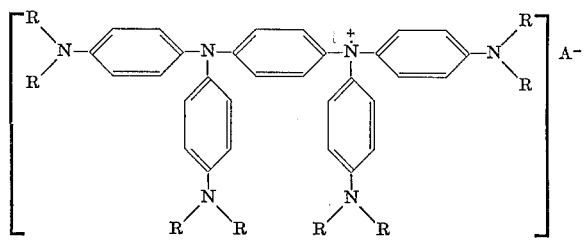

wherein each R individually represents a lower ($C_1$–$C_6$) alkyl radical. The anion of the salt is not critical and may be any of a variety of anions, such as chloride ($Cl^-$), chlorate ($ClO_4^-$), nitrate ($NO_3^-$), sulfate ($SO_4^-$), benzenesulfonate ($C_6H_5CO_3^-$), fluobonate ($BF_2^-$), hexafluoroarsenate ($AsF_6^-$), and hexafluoroantimonate ($SbF_6^-$).

The infrared absorber salts, per se, are disclosed and claimed in a copending application, Ser. No. 607,390, filed Jan. 5, 1967, now U.S. Patent No. 3,484,467 issued Dec. 16, 1969, the disclosure of which is hereby incorporated in the instant application by reference.

While these infrared absorbers are highly useful for incorporation into various plastic materials, their incorporation into clear polymethylmethacrylate by conventional monomer casting techniques has not been successful because the absorbers were either seriously degraded or destroyed in the casting process.

The present invention is based on the discovery that these infrared absorbers can be successfully incorporated into polymethylmethacrylate by an improved monomer casting technique wherein an inert gas purge is used. Thus, in the course of dealing with the degradation problem, applicant discovered that it was caused by the small amounts of dissolved oxygen in the polymethylmethacrylate syrup used in the casting. This discovery was surprising because the problem has not been encountered with other infrared absorbers or any of the additives normally used in the casting technique. As far as is known, therefore, a gas purging has not heretofore been used.

In accordance with the invention, a casting mixture comprising low molecular weight polymethylmethacrylate syrup, catalyst, the infrared absorber and other additives is deaerated by bubbling in an inert gas (nitrogen). The deaerated mixture is then degassed in vacuo to remove the inert gas. The syrup is then poured into a casting cell under an inert gas blanket and cured by heating.

The method of the invention permits the use of the defined class of infrared absorbers in cast polymethylmethacrylate or co-polymers of methylmethacrylate with other co-polymerizable vinyl monomers normally used to make clear plastic sheet, which is used in such applications as sun visors, welding windows and glazing materials where the incorporation of infrared absorbers is needed or desirable. Included among co-polymerizable vinyl monomers are ethyl methacrylate, n-propyl methacrylate, ispopropyl methacrylate, n-butyl methacrylate, ethylene glycol dimethacrylate, neopentyl glycol dimethacrylate and the like.

The castings are made using polymer syrups. It is preferred that the syrup be composed of partially polymerized polymethylmethacrylate (viscosity in the range of about 400 to 800 centipoises) and a small amount of catalyst, preferable azobisisobutyronitrile. The method is also applicable to syrups composed of polymerized polymethylmethacrylate, methyl methacrylate monomer, and catalyst. The syrup may also contain a lubricant, UV absorbers, dyes, pigments, other infrared absorbers, photochromic materials, stabilizers, etc.

Once the casting syrup has been deaerated and degassed according to the method described, it is then poured into a casting cell of the desired dimensions and cured. The curing is generally conducted at a temperature in the range 55 to 70° C. for from 3 to 16 hours, depending on the thickness of the cell. In addition, after curing the polymer it may be subjected to a post-curing cycle at a higher temperature.

The following example further illustrates the invention.

EXAMPLE

To 50 grams of polymethylmethacrylate syrup (low molecular weight polymethylmethacrylate, 450 centipoises) there was added 0.3 g. of bis(p-diethylaminophenyl)[N,N - bis(p - diethylaminophenyl) - p - aminophenyl]aminium hexafluoroantimonate and 0.05 g. of azobisisobutyronitrile. The mixture was well stirred and then deaerated with a nitrogen purge, degassed under vacuum and cast into a glass cell. The casting was cured overnight at 60° C. and then post-cured at 100° C. for 1 hour. An infrared absorption curve of the cast polymethylmethacrylate sheet showed excellent retention of the infrared absorber.

When a casting was made by the normal casting procedure (using no deaeration with nitrogen) the infrared absorption curve of the casting showed a considerable loss of the infrared absorber.

Similar results were obtained when bis(p-dibutylaminophenyl)[N,N - bis(p - dibutylaminophenyl) - p - aminophenyl]aminium hexafluoroantimonate was substituted for bis(p - diethylaminophenyl)[N,N - bis(p - diethylaminophenyl) - p - aminophenyl]aminium hexafluoroantimonate in the above procedure.

I claim:
1. In the method for incorporating an infrared absorber represented by the formula:

wherein each R individually represents lower alkyl and A represents an anion, into polymethylmethacrylate by a casting technique wherein a polymer syrup containing the infrared absorber is poured into a casting cell and heat-cured; the improvement which comprises purging the syrup with an inert gas to remove dissolved oxygen therefrom and then degassing the syrup in vacuum prior to pouring in into the casting cell.

2. The method of claim 1 wherein the inert purging gas is nitrogen.

3. The method of claim 1 wherein the infrared absorber is bis(p - diethylaminophenyl)[N,N-bis(p-diethylaminophenyl) - p - aminophenyl]aminium hexafluoroantimonate.

4. The method of claim 1 wherein the infrared absorber is bis(p - dibutylaminophenyl)[N,N-bis(p-dibutylaminophenyl) - p - aminophenyl]aminium hexafluoroantimonate.

References Cited
UNITED STATES PATENTS

| | | | |
|---|---|---|---|
| 3,413,391 | 11/1968 | Carrol et al. | 264—102 |
| 3,440,257 | 5/1969 | Susi et al. | 260—440 |
| 3,484,467 | 12/1969 | Susi et al. | 260—45.75 |

DONALD E. CZAJA, Primary Examiner

V. P. HOKE, Assistant Examiner

U.S. Cl X.R.

260—45.0, 89.5